United States Patent
Yumoto et al.

(10) Patent No.: US 8,027,246 B2
(45) Date of Patent: Sep. 27, 2011

(54) NETWORK SYSTEM AND NODE APPARATUS

(75) Inventors: Kazuma Yumoto, Fuchu (JP); Hirofumi Masukawa, Isehara (JP); Hitoshi Yoshida, Yokohama (JP); Kazuhiro Kusama, Tokyo (JP); Takuro Mori, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 131 days.

(21) Appl. No.: 12/071,266

(22) Filed: Feb. 19, 2008

(65) Prior Publication Data

US 2008/0253295 A1 Oct. 16, 2008

(30) Foreign Application Priority Data

Apr. 12, 2007 (JP) .................................. 2007-104384

(51) Int. Cl.
*H04J 3/14* (2006.01)
(52) U.S. Cl. ....................................................... 370/216
(58) Field of Classification Search .................. 370/216, 370/242, 245, 248, 363, 364, 489; 709/232; 438/439
See application file for complete search history.

(56) References Cited

U.S. PATENT DOCUMENTS

| 7,469,295 B1 * | 12/2008 | Gangadharan ................ 709/232 |
| 2007/0207591 A1 * | 9/2007 | Rahman et al. ................ 438/439 |
| 2008/0068983 A1 * | 3/2008 | Dunbar et al. ................ 370/216 |

OTHER PUBLICATIONS

"Link Aggregation", 2005 IEEE Standard 802.3-2005, pp. 285-349.
D. Katz et al., "Bidirectional Forwarding Detection", Network Working Group, Internet Draft, Jun. 2006, pp. 1-44.
D. Katz et al., "BFD for IPv4 and IPv6 (Single Hop)", Network Working Group, Internet Draft, Jun. 2006, pp. 1-8.

* cited by examiner

*Primary Examiner* — Kevin C Harper
*Assistant Examiner* — Leon Andrews
(74) *Attorney, Agent, or Firm* — Stites & Harbison PLLC; Juan Carlos A. Marquez, Esq.

(57) ABSTRACT

A failure detection protocol is applied so that failure detection requests for the same aggregated link can be processed even when the failure detection requests differ among routing protocols. The failure detection protocol is executed for each of the physical links that form an aggregated link, and a notification is sent to a higher-level application (for example, a routing protocol), which is a requesting source of a communication line failure monitoring request, with a discrimination between a case in which the communication of the aggregated link in its entirety fails and a case in which some physical links of the aggregated link fail.

11 Claims, 15 Drawing Sheets

FIG. 5
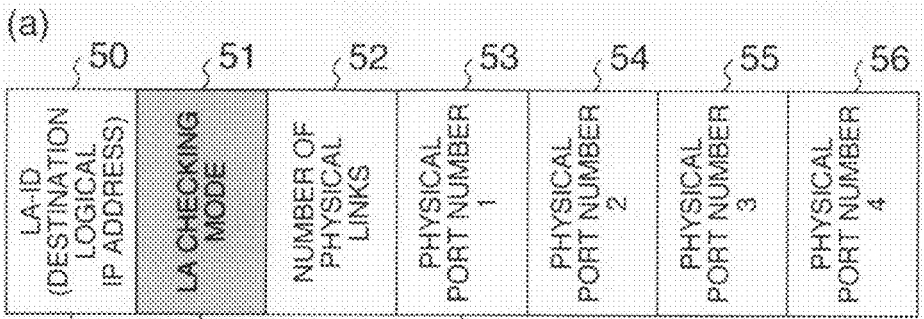
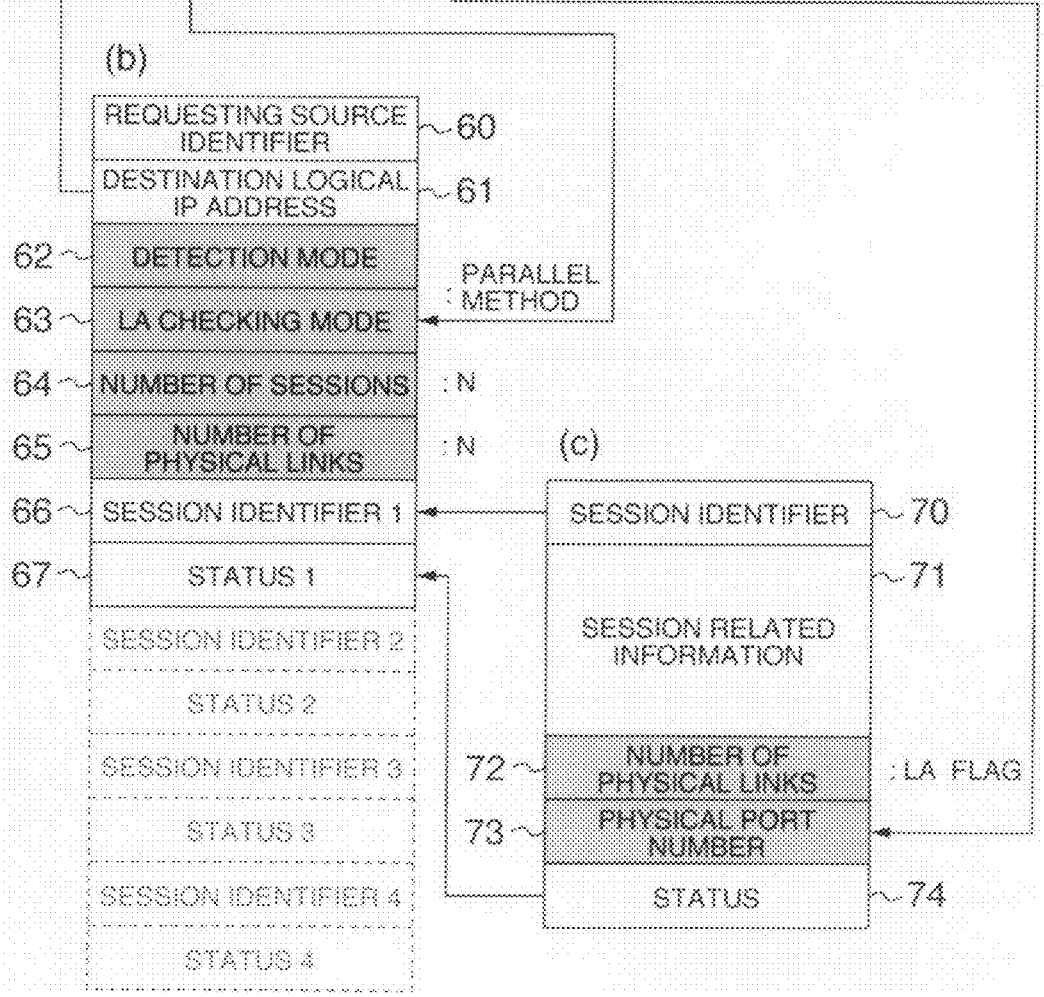

NETWORK SYSTEM AND NODE APPARATUS

INCORPORATION BY REFERENCE

The present application claims priority from Japanese application JP2007-104384 filed on Apr. 12, 2007, the content of which is hereby incorporated by reference into this application.

BACKGROUND OF THE INVENTION

1. Field of the Invention

The present invention relates to a method for applying a failure detection protocol to an aggregated link using a communication protocol in the transport layer.

2. Description of the Related Art

The official standard for link aggregation is described in IEEE802.3ad. According to the technology described in IEEE802.3ad, the capacities of multiple physical links can be combined into one logical link to increase the bandwidth. The aggregated link is made to appear to the layers equal to or higher than the network layer of the OSI reference model, such as IPv4 or IPv6, as one MAC.

The standardization work of BFD (Bidirectional Forwarding Detection) is carried out by IETF (Internet Engineering Task Force) for creating a routing-protocol-independent protocol for detecting a communication failure between nexthops (see Bidirectional Forwarding Detection, draft-ietf-bfd-base-5, June, 2006 and BFD for IPv4 and IPv6 (single hop), draft-ietf-bfd-v4v6-1hop-5 June, 2006). BFD uses UDP to send and receive packet regularly between systems and, if packets are not received for a predetermined time, determines that a communication line failure has occurred. Usually, BDF performs the failure monitoring of a communication line based on a request from a routing protocol. When a failure monitoring request is generated for the same data protocol path from multiple routing protocols, BDF performs the monitoring in a single BFD session.

SUMMARY OF THE INVENTION

An aggregated link is identified as a single communication path by a protocol such as BFD used in layer 3 or higher. When a failure detection protocol for layer 3 or higher is used for a path virtualized as one communication path in this way, a communication inoperable condition is detected if the communication of all physical aggregated links fail but a failure in each of the aggregated individual physical links cannot be detected.

There is a possibility that monitoring requests for the same aggregated link are issued from multiple routing protocols to BFD. In this case, some routing protocol attempts to use the communication line continuously if at least one physical link is effective. However, some other routing protocol sometimes wishes to switch to another communication path where the bandwidth is guaranteed if one or more aggregated physical links fail and the desired bandwidth cannot be guaranteed. Thus, the problem with the current mechanism is that failure detection requests for an aggregated link cannot be processed when they differ according to the routing protocols.

In one embodiment of the present invention, the failure detection protocol is executed for each of the physical links that form an aggregated link and a notification is sent to a higher level application (for example, a routing protocol) that is a source that issues a communication line failure monitoring request with a discrimination between a case in which the communication of the aggregated link in its entirety fails and a case in which some physical links that form the aggregated link fail.

In another embodiment of the present invention, the failure detection protocol is executed for the physical links, which form an aggregated link, in the round robin method. When BFD is used as the failure detection protocol in this embodiment, the request mode or the echo function is used for the operation. If no response is received from the other system, a notification is sent to a higher-level application to notify that a failure is generated on the physical link from which no response is received. If all physical links that form the aggregated link fail, a notification is sent to notify that an aggregated link failure is generated.

The method for applying the failure detection protocol to an aggregated link according to the present invention establishes a failure detection protocol session and sends or receives a packet with each of the physical links of the aggregated link in mind. Therefore, this method makes it possible to identify a communication line error not only on a basis of the whole aggregated link but also on a basis of each of the physical links that form the aggregated link, thus achieving an effect that failure monitoring requests from routing protocols are processed even if the path switching conditions for the aggregated link differ among the routing protocols.

BRIEF DESCRIPTION OF THE DRAWINGS

FIG. 5 is a diagram showing an example of the configuration of the failure detection program management table in a method in which the physical links of an aggregated link are checked in parallel.

DETAILED DESCRIPTION OF THE EMBODIMENTS

Figure 1:
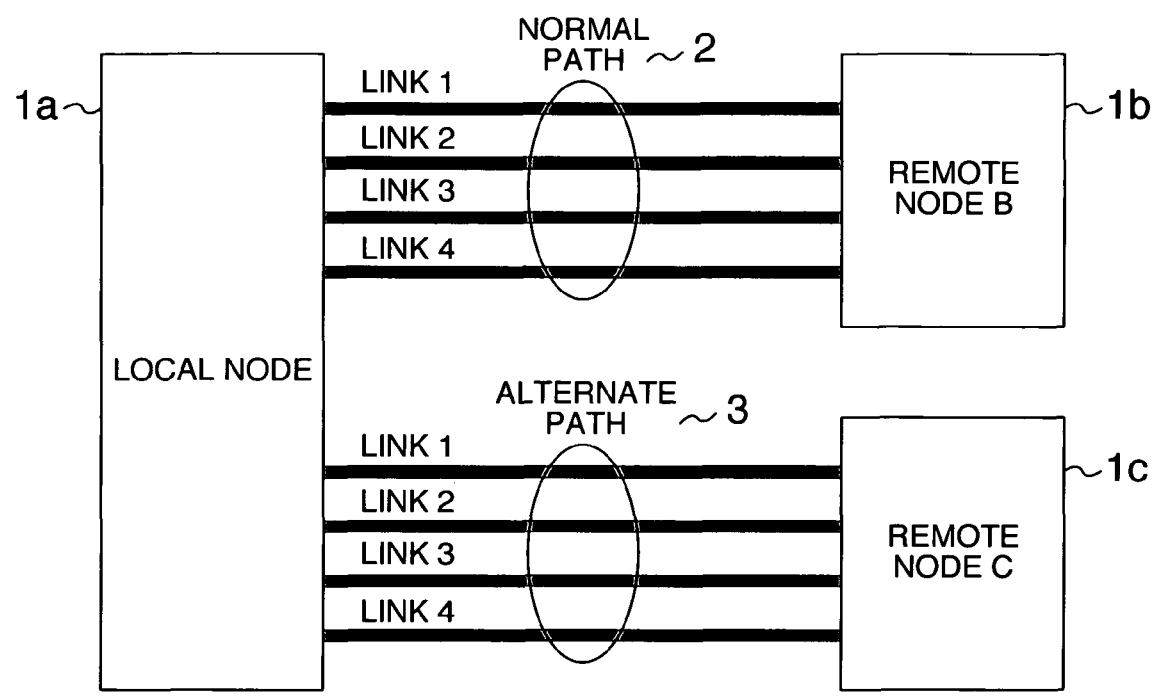
FIG. 1 is a diagram showing an example of the configuration of a system to which an aggregated link is used between nodes.

FIG. 1 is a diagram showing an example of the configuration of a system in an embodiment of the present invention in which aggregated links are applied between nodes. An aggregated link composed of multiple links (four links, link 1 to link 4, in the example in FIG. 1) is created as a normal path 2 for operation between a local node 1a and a remote node 1b. On the other hand, an aggregated link is created as an alternate path 3 between the local node 1a and a remote node 1c so that it has the same bandwidth as that of the normal path 2.

Figure 16A:
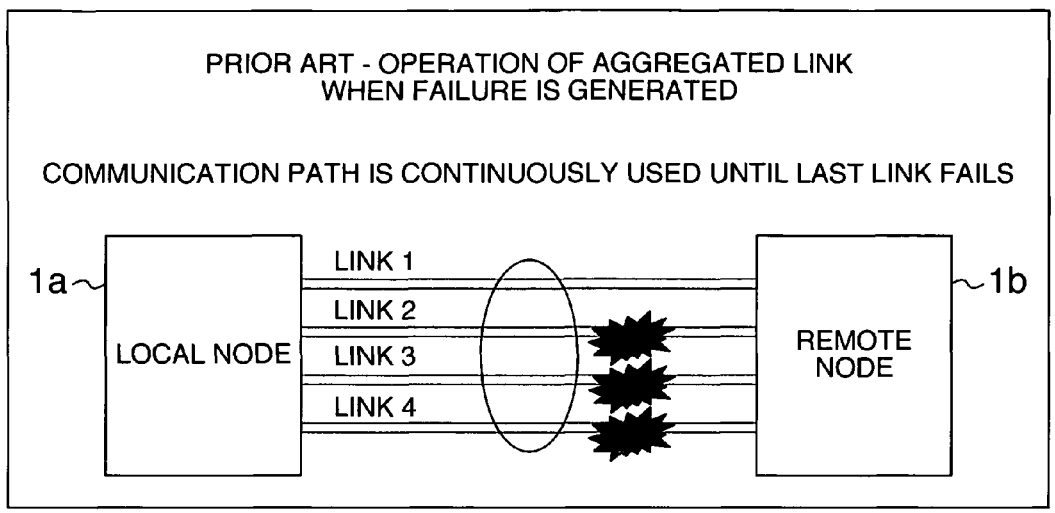
FIGS. 16A-16C are diagrams showing examples of general behaviors of an aggregated link when failures occur on physical links.
Figure 16B:
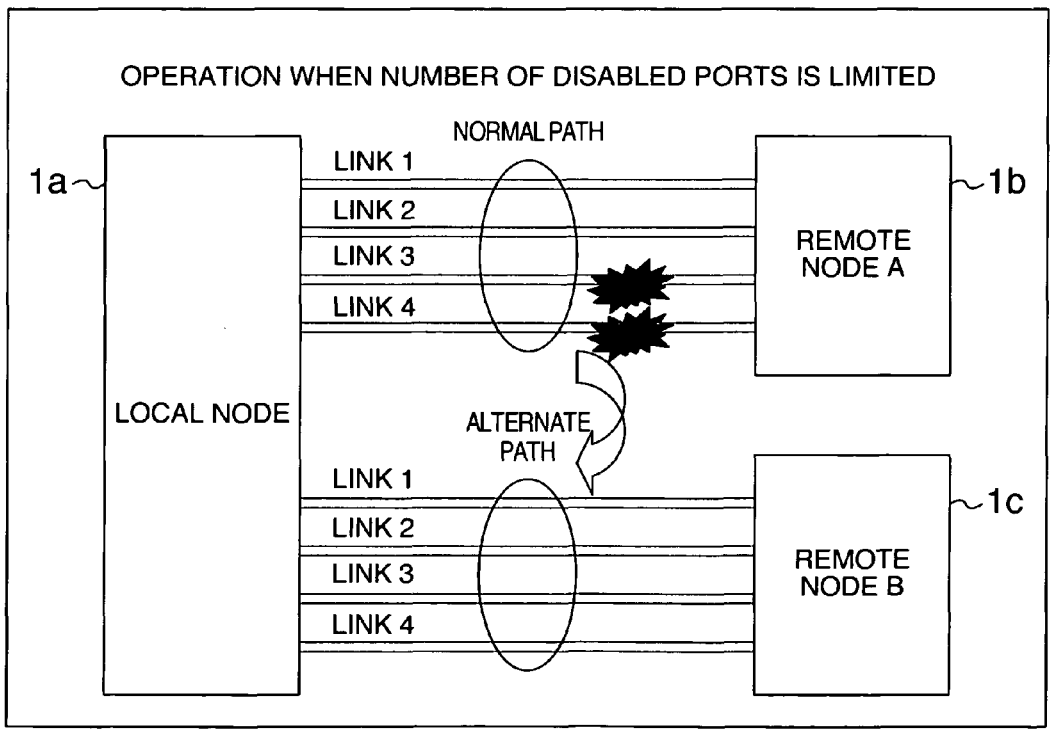
Figure 16C:
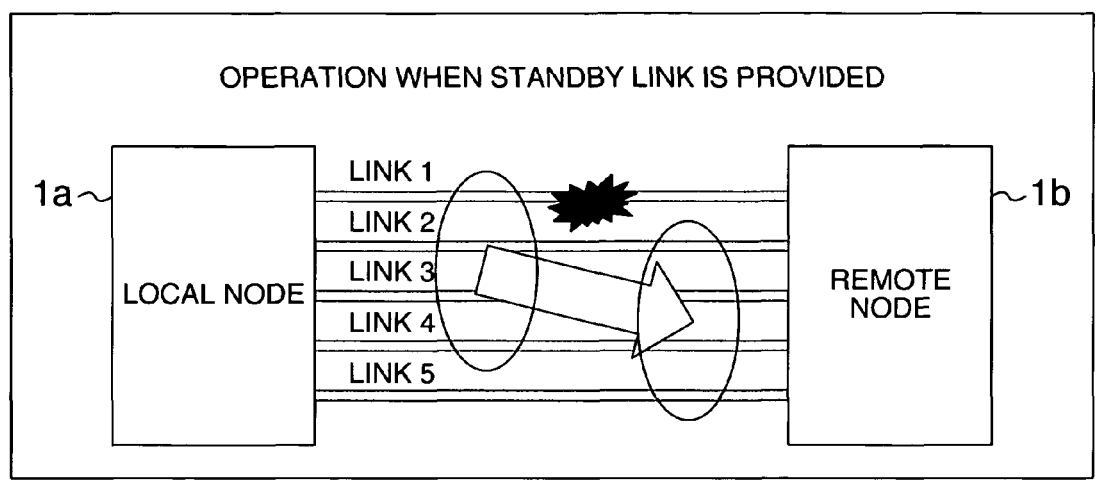

An aggregated link behaves in one of the following three operation modes, shown in FIG. 16A to FIG. 16C, when a failure is generated on one or more links of the aggregated link.

In the operation mode shown in FIG. 16A, the path (aggregated link) is continuously used until all links comprising the aggregated link fail. In this case, the traffic that has been using the failed links is aggregated into other effective links. That is, if a failure is generated on one or more physical links comprising the aggregated link, the communication bandwidth is decreased but the communication path continues the operation if at least one physical link is in operation.

In the operation mode shown in FIG. 16B, when a pre-set number of physical links comprising an aggregated link fail, the communication path is switched to an aggregated link provided as the alternate path. In this operation mode, when one or more physical links fail and the bandwidth is decreased to such an extent that the minimum required bandwidth cannot be maintained, the communication path is switched to the alternate path to guarantee the minimum communication bandwidth that must be maintained.

In the operation mode shown in FIG. 16C, a standby physical link is provided and, when a failure is generated on a physical link comprising an aggregated link, the physical link on which the failure is generated is switched to the standby link to reconfigure the aggregated link.

In all of those three operations modes, the same operation is performed for any path control system (routing protocol). For example, though the requirement for the path communication bandwidth differs between OSPF (Open Shortest Path First) and MPLS (Multi-Protocol Label Switching), the prior-art system cannot process those differences flexibly. The present invention provides a method for applying the failure detection protocol to an aggregated link to allow each routing protocol to individually determine which path switching is to be performed according to the degree of a failure generated on physical links comprising an aggregated link. More specifically, the present invention provides an aggregated link failure notification method that allows each routing protocol to determine to use the operation mode shown in FIG. 16A in which the same path is continuously used until all physical links become inoperable or to use the operation mode shown in FIG. 16B in which the communication path is switched when the number of failed physical links is increased to such an extent that the minimum required bandwidth cannot be maintained.

Figure 2:
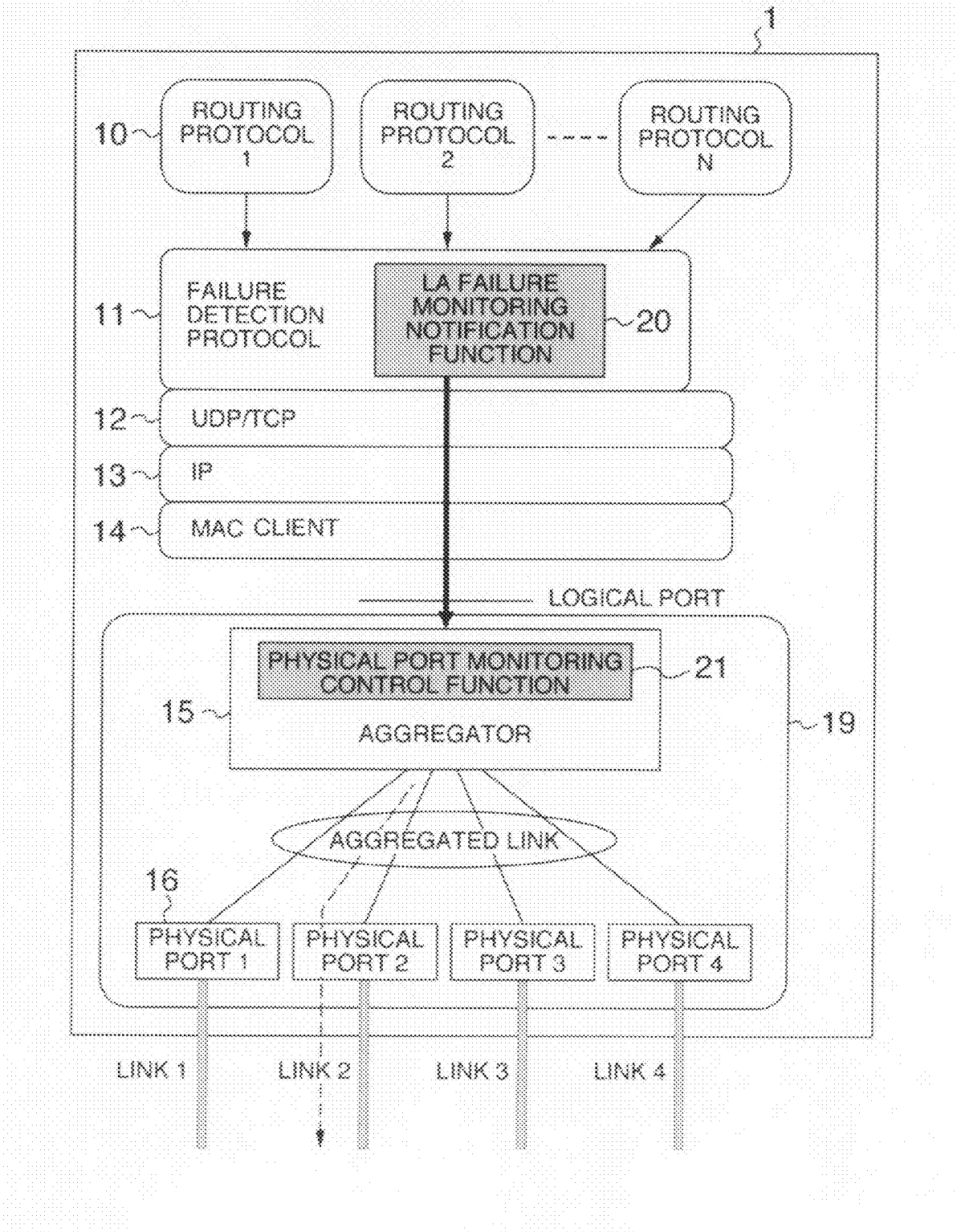
FIG. 2 is an apparatus block diagram showing an example of a method for applying the failure detection protocol to an aggregated link.
Figure 15:
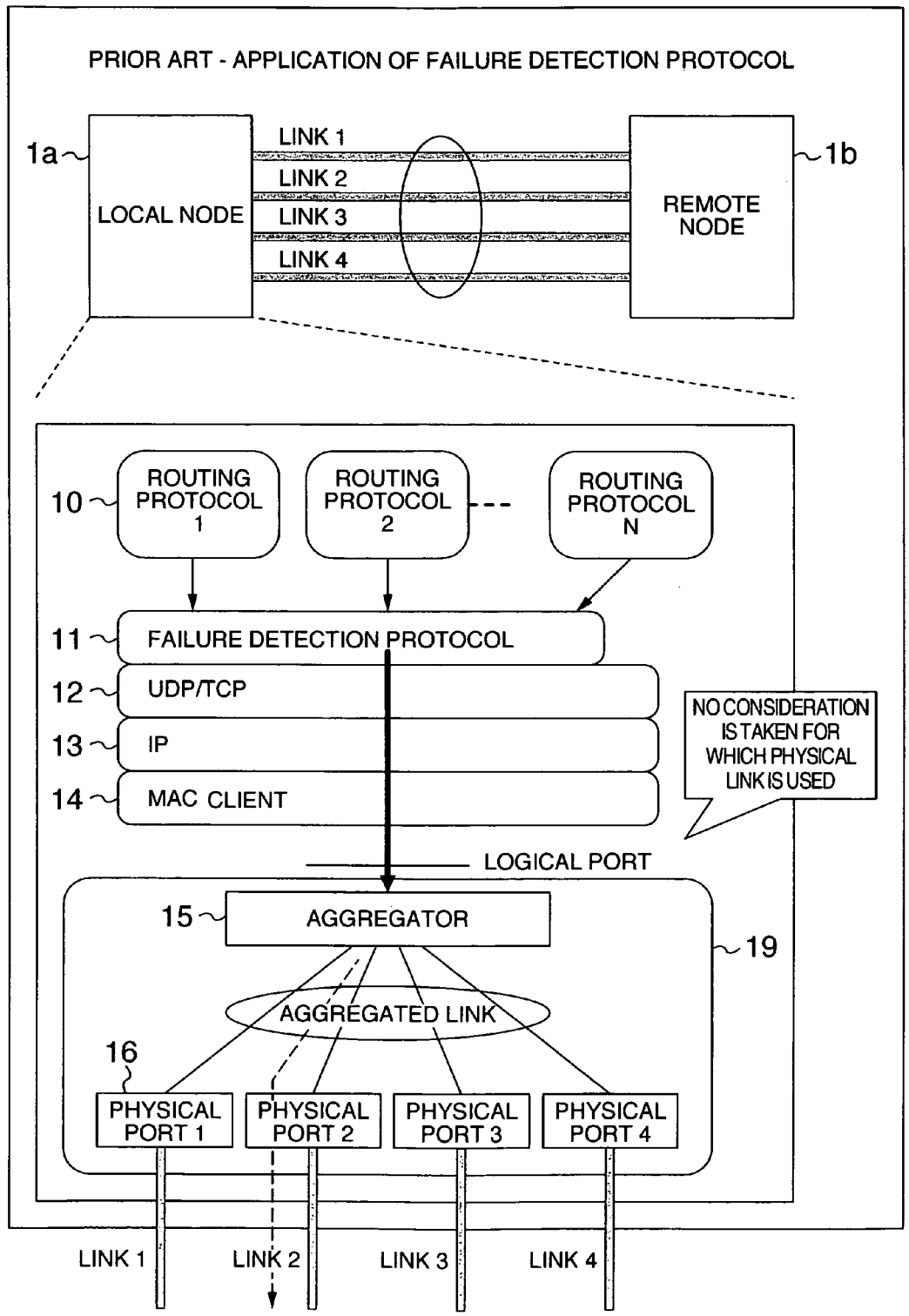
FIG. 15 is a diagram showing an example of the apparatus block configuration when the failure detection protocol is used without applying the present invention to an aggregated link.

FIG. 2 is a block diagram showing an example of an apparatus that performs a method for applying the failure detection protocol to an aggregated link in an embodiment of the present invention. The figure shows only the elements of a node apparatus 1 that are related to the present invention. When a request is received from a path control functional module such as a routing protocol 10, a failure detection protocol 11 monitors the communication path for a communication failure. When a protocol for use in a layer equal to or higher than layer 3 is used as the failure detection protocol, there are a UDP/TCP layer 12, an IP layer 13, and a MAC client 14 between the failure detection protocol 11 and an aggregator 15. An aggregated link, though identified by the aggregator as one virtualized communication-path, actually comprises multiple physical ports 16. The configuration described above is the same as that of the prior-art system shown in FIG. 15. In the prior-art configuration, the links aggregated by the aggregator 15 is identified by a higher-level communication protocol layer as one communication path. So, the failure detection protocol 11 cannot identify the individual physical links comprising the aggregated link. To solve this problem, the present invention provides an aggregated link failure monitoring notification function 20 in the failure detection protocol 11, and a physical port monitoring control function 21 in an aggregation system 19, to monitor a communication path failure on a physical link basis. The physical port monitoring control function 21, though included in the aggregator 15 in FIG. 2, may also be implemented as an extended function of the LACP (Link Aggregation Control Protocol).

Figure 3:
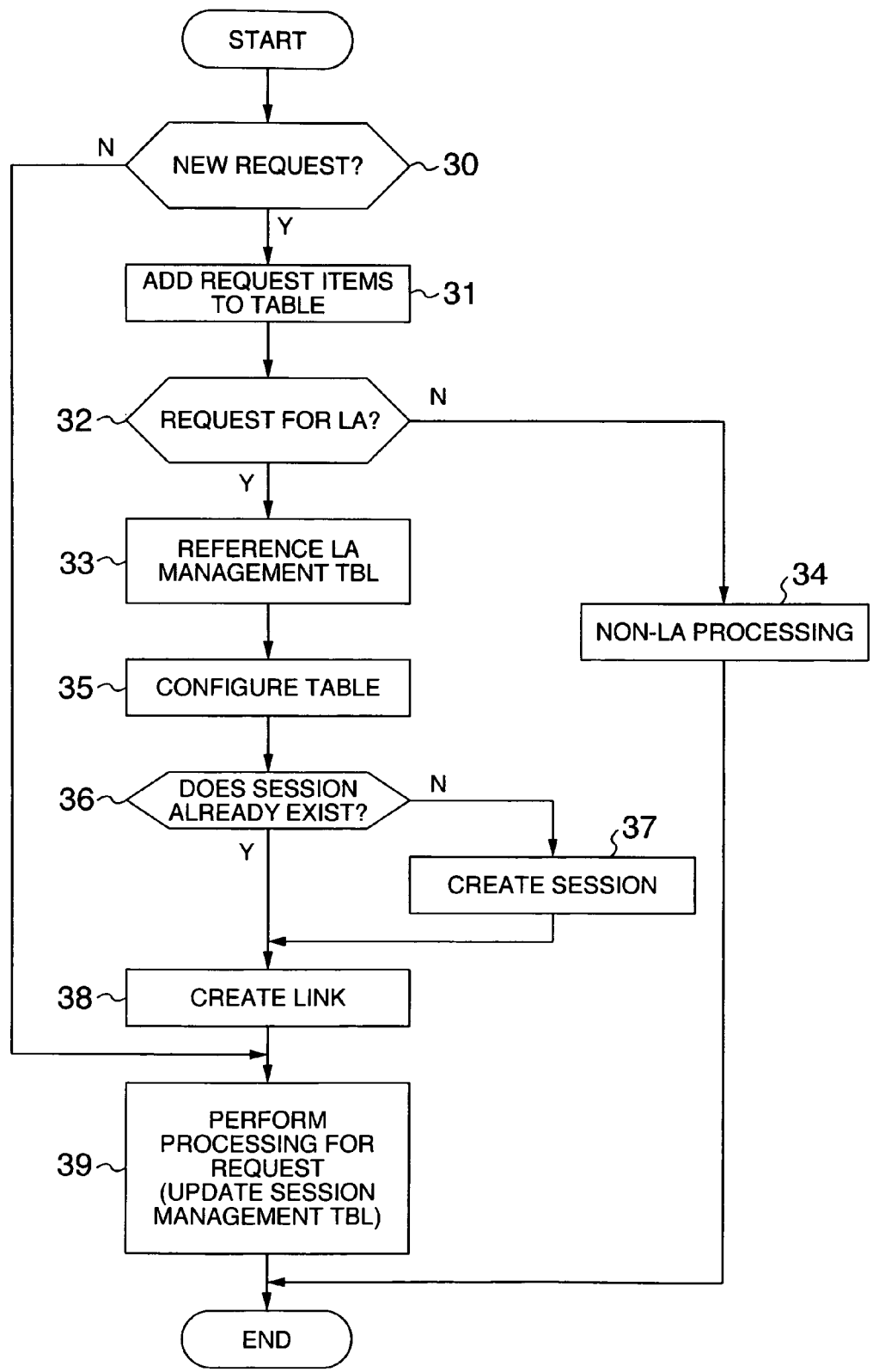
FIG. 3 is a flowchart showing an example of the processing procedure of the aggregated link failure monitoring notification function for a request from a routing protocol.

FIG. 3 is a flowchart showing an example of the processing procedure of the aggregated link failure monitoring notification function 20. When a new monitoring request is received from a routing protocol 10 (step 30), the aggregated link failure monitoring notification function 20 adds the items of the request to the management table (step 31).

Figure 4:
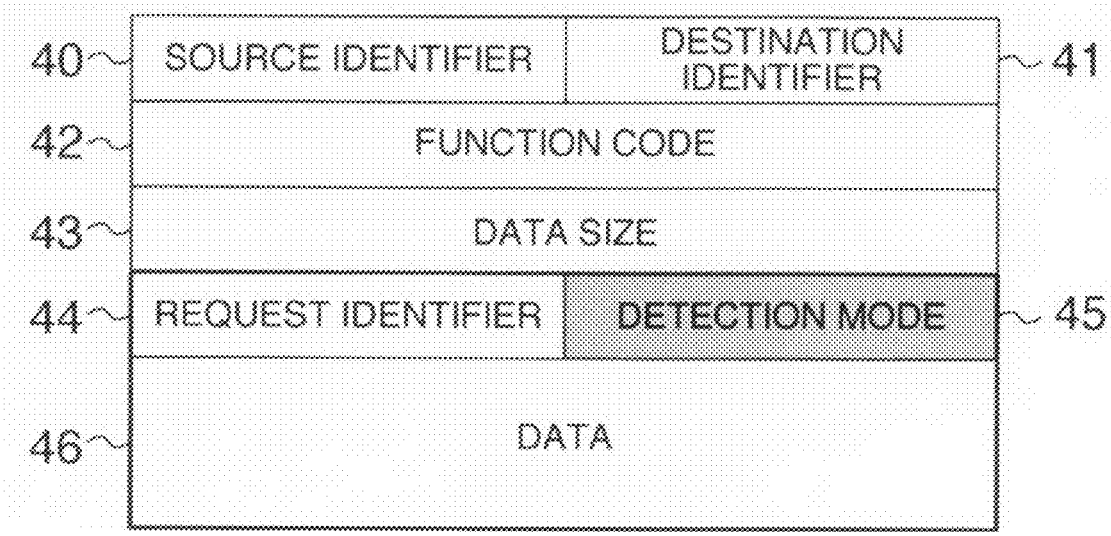
FIG. 4 is a diagram showing an example of the configuration of a message transferred between a routing protocol and a failure detection protocol.
Figure 8:
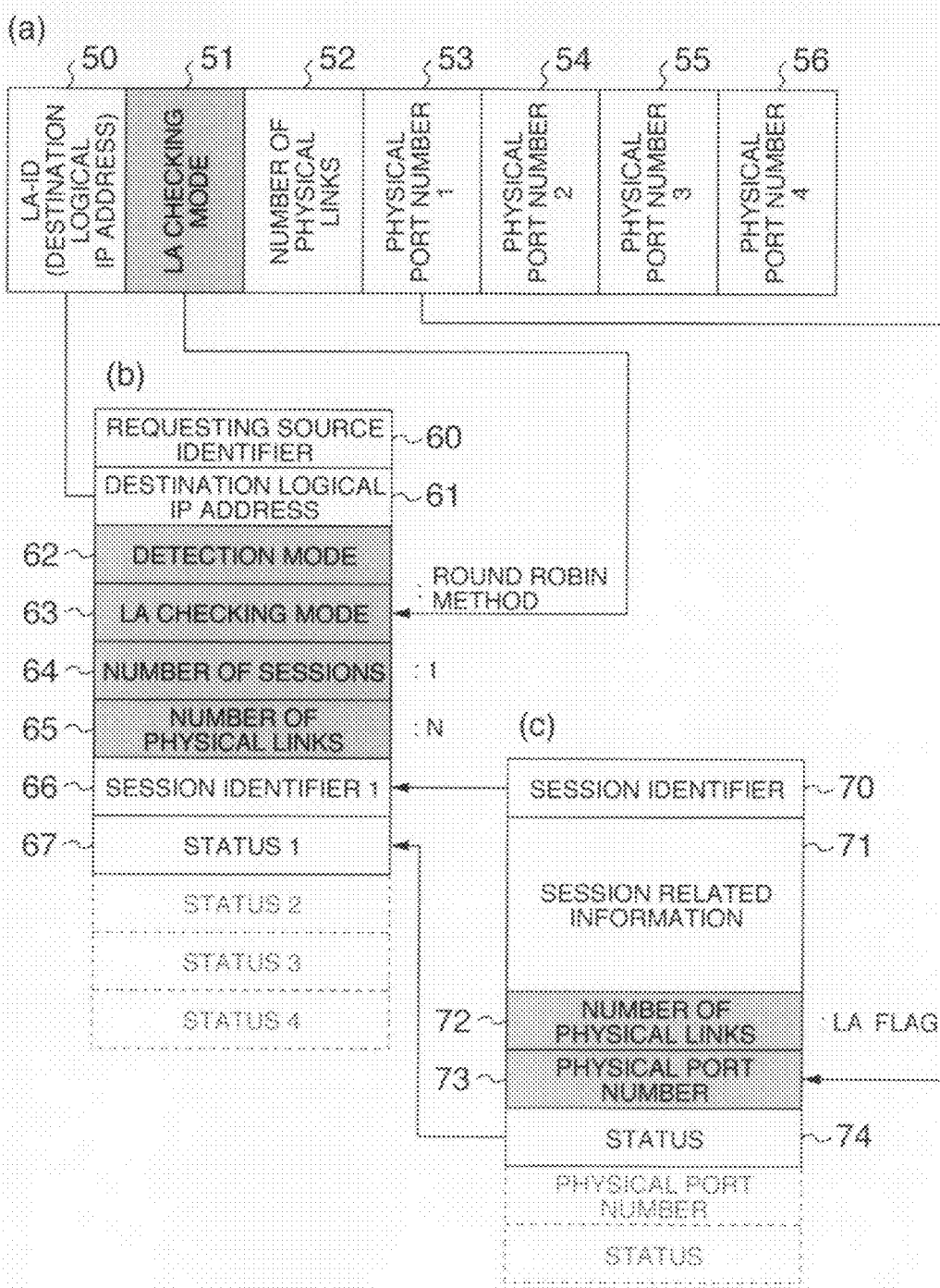
FIG. 8 is a diagram showing an example of the configuration of the failure detection program management table in the method in which the physical links of an aggregated link are checked in the round robin method.

FIG. 4 shows an example of the configuration of a monitoring request instruction (a message received by the failure detection protocol 11 in step 30) issued from the routing protocol 10 to the failure detection protocol 11. FIG. 5 and FIG. 8 show examples of the configuration of the management tables used by the failure detection protocol 11. FIG. 4, FIG. 5, and FIG. 8 will be described in detail later. The management table, to which a request item is added in step 31, corresponds to the table indicated by (b) in FIG. 5 or FIG. 8.

The processing of the present invention is performed when the items of a communication path added in step 31 are those of an aggregated path. To check if the communication path belongs to those of the aggregated path (step 32), the function checks the table indicated by (a) in FIG. 5 or FIG. 8. More specifically, the function searches an aggregated link identifier 50 in the table in part (a) for an item whose value of the destination logical IP address matches the value in the table in part (b). The table in part (b) is a table in which a request from a routing protocol is managed, while the table in part (a) is a table in which the configuration of an aggregated link is managed. The master table of the table in part (a) is maintained usually in the aggregation system. So, the failure detection protocol 11 references the table in the aggregation system or a synchronized copy table provided in the failure detection protocol.

If the checking result in step 32 indicates that the items of the communication path are not those of an aggregated path, the conventional processing is performed (step S34). On the other hand, if the checking result indicates that the items of the communication path are those of an aggregated path, the function checks the corresponding table items in the aggregated link management table in part (a) in detail (step 33) and forms the corresponding table items in the table in part (b) (step 35). More specifically, the value of an aggregated link checking mode 51 in the table in part (a) is synchronized with the corresponding item 63 in the table in part (b). The number-of-physical-links 65 in the table in part (b) is synchronized with the corresponding item (52) in the table in part (a). The aggregated link checking mode, an item extended in the present invention, reflects the checking mode of the failure detection protocol on an aggregated link basis that is set by a configuration command/file such as Config. The checking mode (method) is a parallel method in which the physical links of an aggregated link are checked in parallel or a round robin method in which the physical links of an aggregated link are checked sequentially. The parallel method in which the physical links are checked in parallel has the advantage that the failure detection is performed quickly. On the other hand, the round robin method has the advantage that the communication amount per unit time for detecting a failure in an aggregated link is smaller than that in the parallel method. A requesting source identifier 60, a destination logical IP address 61, and a detection mode 62 in the table in part (b) are acquired from the content of the monitoring request instruction received from the routing protocol 10. When the monitoring request instruction has a configuration such as the one shown in FIG. 4, the value of the requesting source identifier 60 is acquired from a request identifier 44, the value of the destination logical IP address 61 is acquired from a destination identifier 41, and the value of the detection mode 62 is acquired from a detection mode 45.

The following describes an example of the configuration of a monitoring request instruction shown in FIG. 4. A source identifier 40 is the identifier of the routing protocol 10 that issues the monitoring request instruction, and the destination identifier 41 is the identifier of a destination, such as the failure detection protocol 11, to which a request instruction is issued from a routing protocol. A function code 42 includes a monitoring session establishment request, a disconnection request, or a parameter change request. On the other hand, when a notification is sent from the failure detection protocol 11 to the routing protocol 10, the source identifier 40 is the identifier of the failure detection protocol 11 and the destination identifier 41 is the identifier of the routing protocol 10. In this case, the function code 42 includes a failure notification or a monitoring session disconnection notification. A data size 43 specifies the length of data that follows. The detection mode 45 specifies one of failure detection modes, that is, a mode in which a notification is sent when the communication of all physical ports fails, a mode in which a notification is sent when the specified number of ports are disabled and the communication fails, or a mode in which the normal monitoring operation other than that for an aggregated link is performed. A data part 46 includes various types of information such as information (source IP address, destination IP address) for identifying a communication line to be monitored, the operation parameters (minimum transmission interval, minimum reception interval, failure detection multiplier) of the failure detection protocol, and so on. In the configuration of a message sent and received between the routing protocol 10 and the failure detection protocol 11, the detection mode 45 is an item extended by the present invention.

Retuning to the description of the management table in part (b), the value of a number-of-sessions 64 of the failure detection protocol for an aggregated link depends on the content of an aggregated link checking mode 63 in this management table. That is, when the aggregated link checking mode is the parallel method, the number of sessions is the same as the value of the number-of-physical-links 65; when the aggregated link checking mode is the round robin method, the number of sessions is 1.

A management table in part (c) is a table that manages the sessions of the failure detection protocol. A session identifier 66 and a status 67 of the management table in part (b) correspond respectively to a session identifier 70 and a status 74 of the management table in part (c). When the aggregated link checking mode is the parallel method, the management table in part (b) includes pairs of the session identifier 66 and the status 67 that are repeated for the number-of-sessions (64), once for each session, as shown in FIG. 5. On the other hand, when the checking mode is the round robin method, the management table in part (b) includes only the items of status 67, each indicating the status of a physical link, that are repeated for the number-of-sessions (64), one for each session, as shown in FIG. 8. The configuration of the management table in part (c) is also extended from the conventional configuration. A number-of-physical-links 72, which comprises an aggregated link, and a physical port number 73 are the elements added by the present invention. In the parallel method, a session is performed for each physical port as shown in FIG. 5; in the round robin method, a session is performed for each aggregated link and, so, pairs of the physical port number 73 and the status 74 are arranged for the number-of-physical-links (72), one pair for each session, as shown in FIG. 8. Session related information 71 includes various types of information and, in this example, includes the parameters such as those specified by the data part 46 of the monitoring request instruction.

Figure 14:
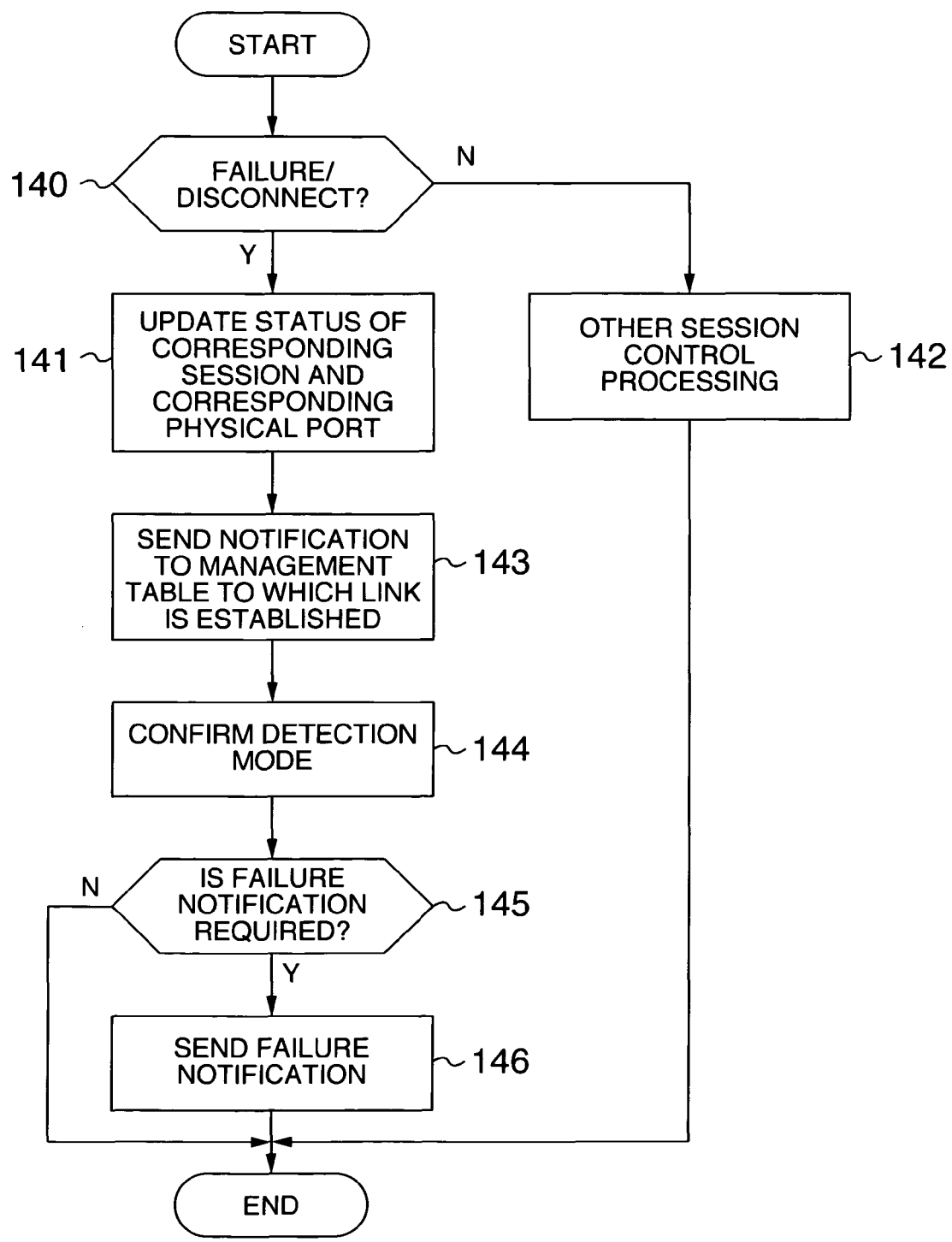
FIG. 14 is a flowchart showing an example of the processing procedure of the aggregated link failure monitoring notification function when a message is received from the physical port monitoring control function.

The configuration of the management tables described above allows communication failure monitoring to be performed according to the detection mode (all ports/specified number of ports). The operation performed by the aggregated link failure monitoring notification function 20 when a communication failure is generated in each physical port will be described with reference to FIG. 14. If the content of a message notified from the physical port monitoring control function 21 to the aggregated link failure monitoring notification function 20 is a communication line failure notification or a session disconnection notification (step 140), the function updates the status 74 of the session and the physical port number 73 in the management table in part (c) (step 141). When the status 74 of the management table in part (c) is updated, the function sends the notification also to the management table in part (b) to which the link is established and updates the status 67 of the session 66 (step 143). When the status 67 of the management table in part (b) is updated, the function confirms the setting of the detection mode 62 (step 144) to determine if the failure notification should be sent to the routing protocol 10 (step 145). For example, if the setting of the detection mode is "all ports" (a notification is sent when the communication of all physical ports fails), a notification is sent when the content of all items of the status 67 is "failure" or "disconnect" (step 146). On the other hand, if the setting of the detection mode is "specified number of ports" (a notification is sent when the specified number of ports are disabled and the communication fails), a notification is sent when the number of physical ports whose content of the status 67 is "failure" or "disconnect" exceeds the specified number of ports (step 146).

Returning to the description of the flowchart in FIG. 3, the function determines, after configuring the table (especially, management table in part (b)) in step 35, if a failure detection protocol session for the communication line already exists (step 36). For example, if the management table in part (c) for the communication line already exists, the function determines that the session already exists. If no session exists, the function creates a new session and adds the management table in part (c) (step 37). Links are established for related session information between the management table in part (c) and the management table in part (b) (step 38). After that, the function performs processing specific to the request instruction (step 39). For example, when the Config setting is updated, the request instruction is issued to change the monitoring parameters and the processing for it is performed at this time.

Figure 6:
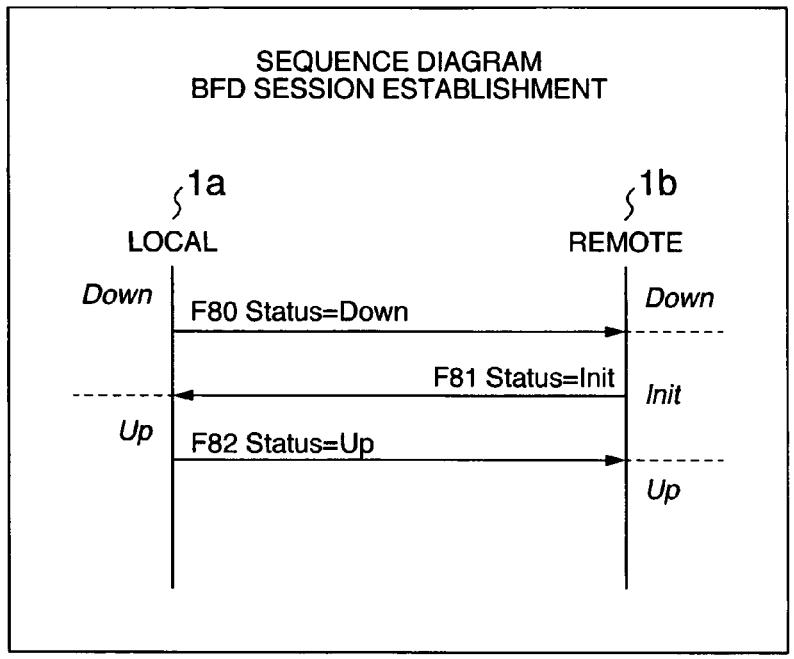
FIG. 6 is a diagram showing an example of the failure detection protocol session establishment procedure.
Figure 7:
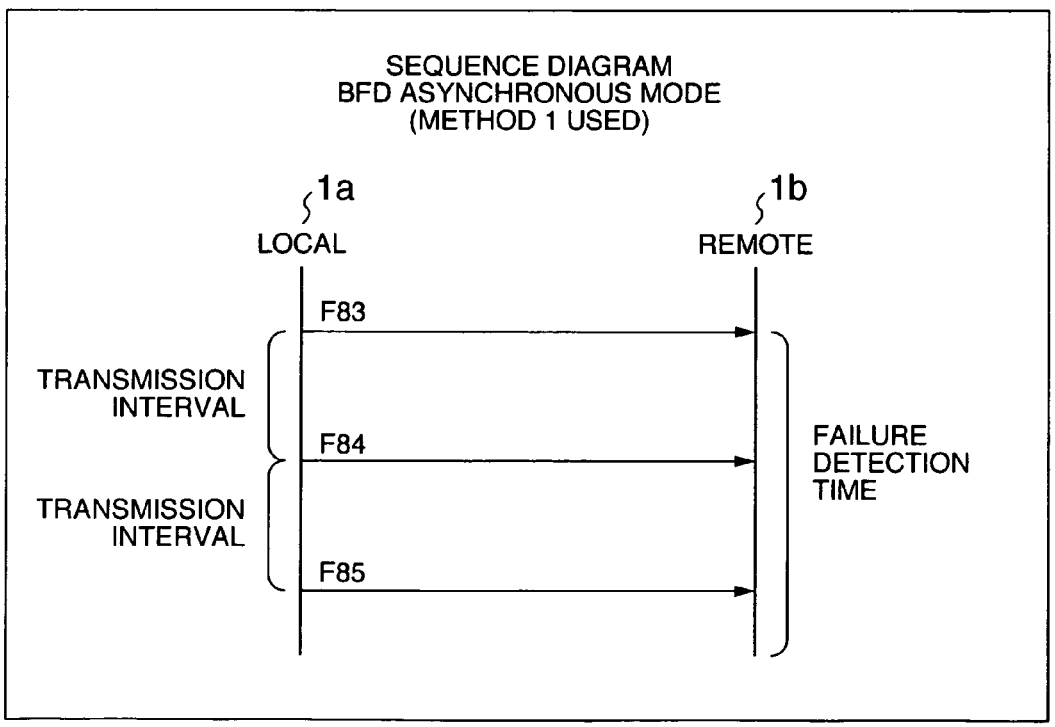
FIG. 7 is a diagram showing an example of the operation of the failure detection protocol used in the method in which all physical links are checked in parallel.
Figure 9:
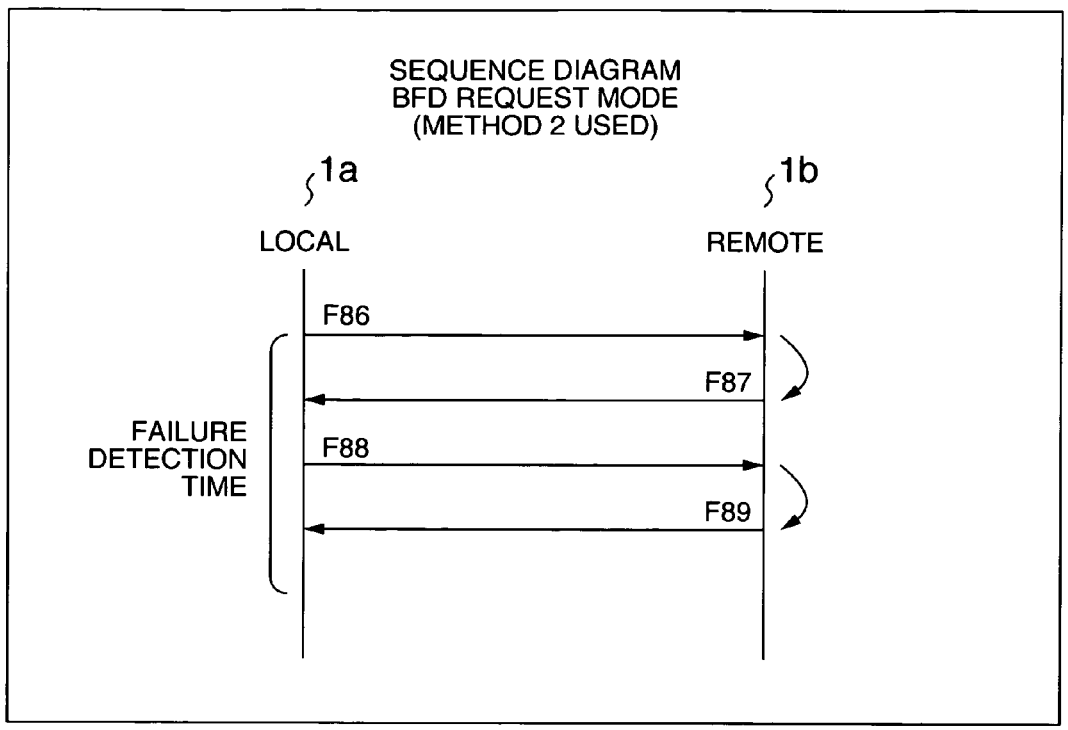
FIG. 9 is a diagram showing an example of the operation of the failure detection protocol used in the method in which the physical links are checked in the round robin method.

The creation of a link depends on the aggregated link checking mode. The physical links of an aggregated link are checked in parallel in the parallel method while the physical links of an aggregated link are checked sequentially in the round robin method. A session is created for each physical link in the parallel method while one session is created for an aggregated link in the round robin method. FIG. 6 shows the session establishment procedure when BFD (Bidirectional Forwarding Detection) is used as the failure detection protocol, FIG. 7 shows an example of the operation in the BFD asynchronous mode used for checking in the parallel method, and FIG. 9 shows an example of the operation in the BFD request mode used for checking in the round robin method. The BFD state machine has three states, "Down", "Init", and "Up", and a sending packet includes the local state. If a packet including the remote state "Down" is received when the local state is "Down" (F80), the state transition to "Init" occurs. Similarly, if a packet including the remote state "Init" is received when the local state is "Down" (F81), the state transition to "Up" occurs. If a packet including the remote state "Up" is received when the local state is "Init" (F82), the state transition to "Up" occurs. A session is established when the state becomes "Up". Because a session is created for each physical link in the parallel method, the session establishment communication such as the one shown in FIG. 6 is performed for each physical link. On the other hand, because a session is established for each aggregated link in the round robin method, the communication from F80 to F82 may also be performed on a different physical link.

Although only the communication in one direction is shown in FIG. 7, the same communication is actually performed in the opposite direction. Communication is performed at a session establishment time and packets are sent at an adjustment transmission interval (F83, F84, F85). For example, if the receiving side receives a packet at F83 and, after that, no packet is received during the failure detection time, it is assumed that a communication line failure has occurred. In the parallel method, this monitoring is performed for each physical link.

In the request mode operation shown in FIG. 9, the checking is performed on the premise that the response F87 is returned in response to the packet F86 sent from one side. The packet F88 may be re-sent if the response F87 cannot be received but, if the response (F87 or F89) is not received within the failure detection time, it is assumed that a communication line failure is generated. In the round robin method, the response to the transmission packet uses the same physical link. The operation is repeated in such a way that the physical link is determined to be normal if the response is received and, after that, the next physical link is checked.

Figure 10:
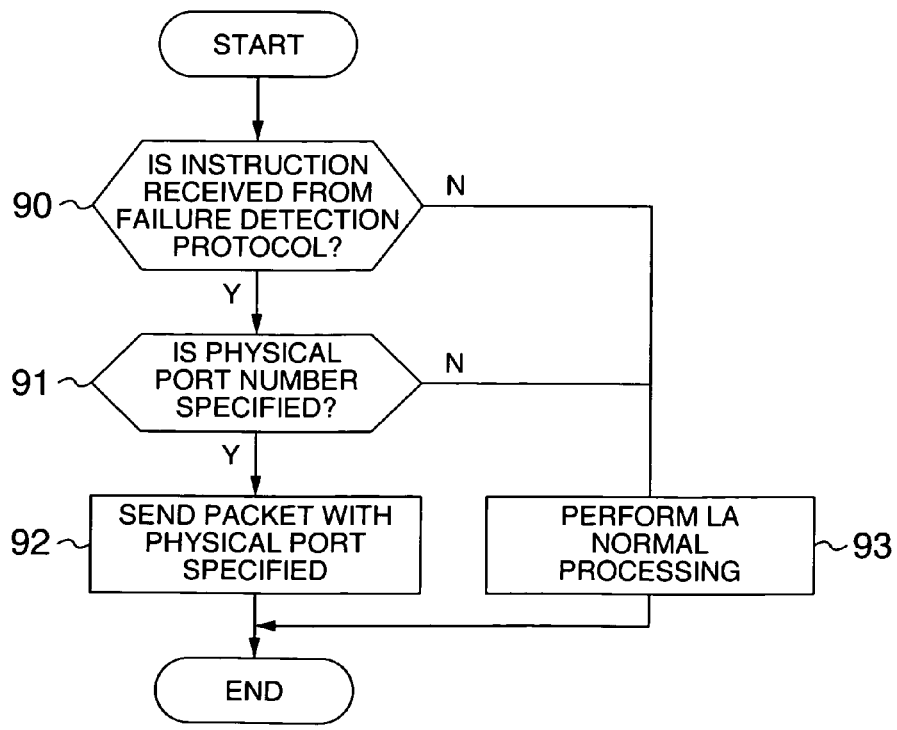
FIG. 10 is a flowchart showing an example of the processing procedure of the physical port monitoring control function for a request from the failure detection protocol.

FIG. 10 is a flowchart showing an example of the processing procedure of the physical port monitoring control function 21 that is executed when a request is received from the failure detection protocol 11. If an instruction is received from the failure detection protocol 11 (step 90), the function further checks if a physical port number is specified (step 91). If a physical port number is specified, the function sends a packet with the physical port specified (step 92). If a physical port is not specified or the instruction is not issued from the failure detection protocol, the function performs the normal packet transmission processing using an aggregated link (step 93). That is, the aggregated link failure monitoring notification function 20 in the failure detection protocol 11 specifies a physical port, which is the destination of the packet, according to the checking mode.

Figure 11:
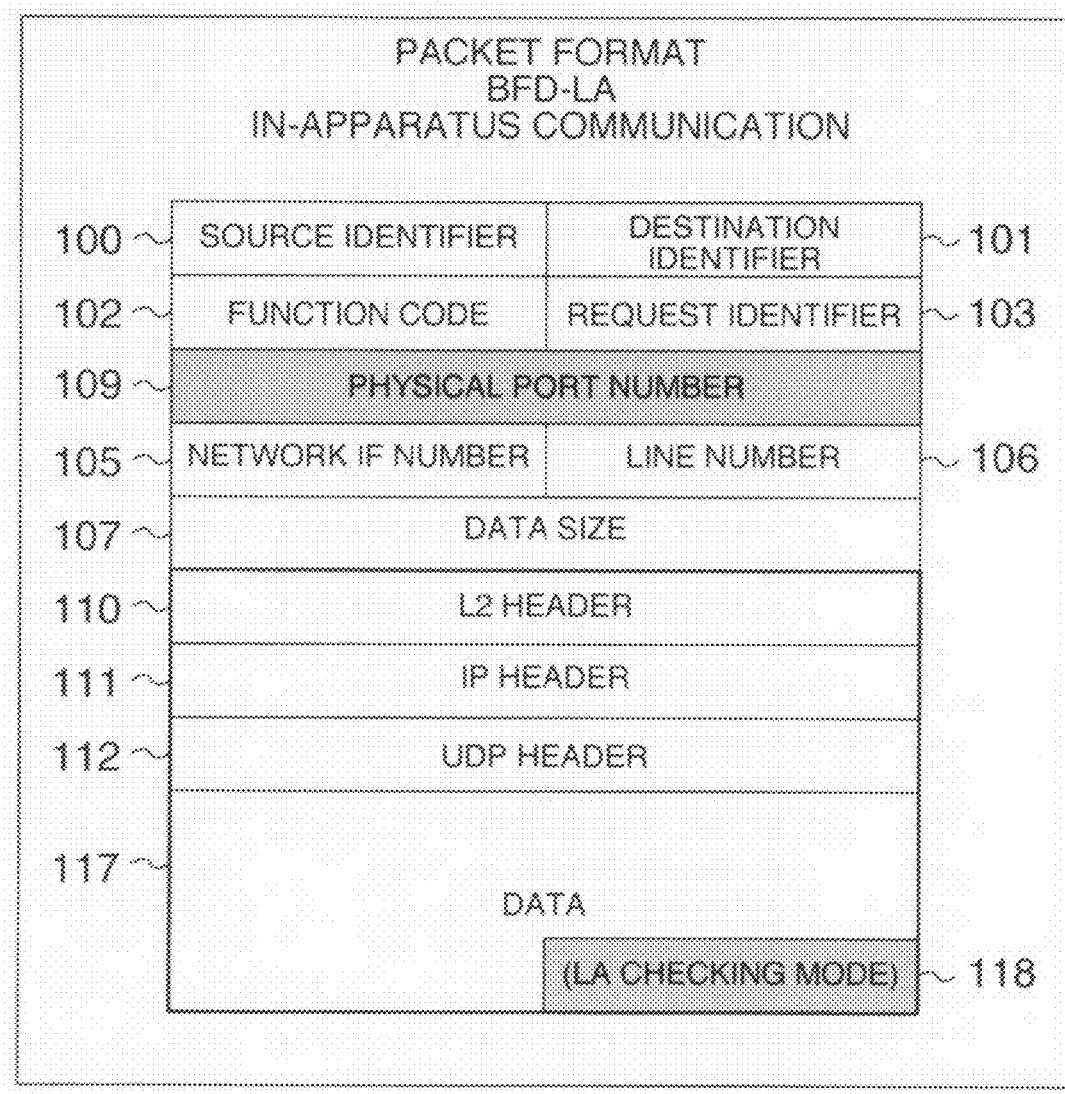
FIG. 11 is a diagram showing an example of the configuration of a message transferred between the failure detection protocol and an aggregator.
Figure 12:
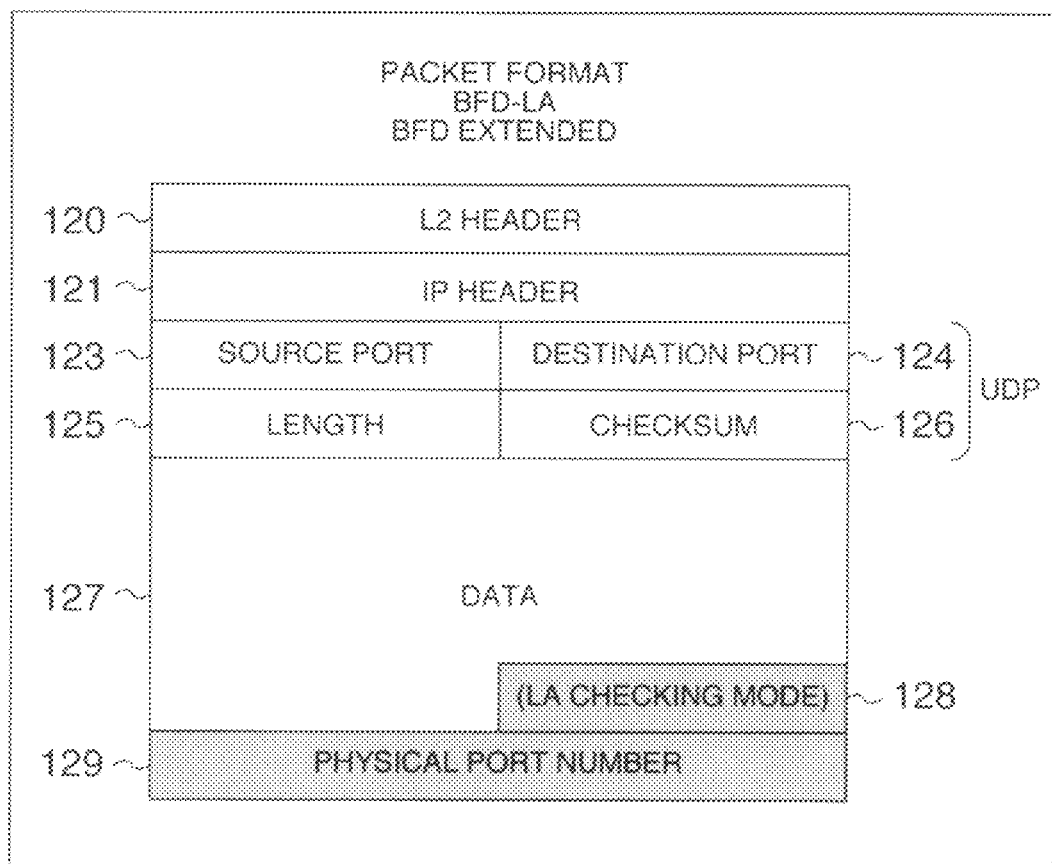
FIG. 12 is a diagram showing another example of the configuration of a message transferred between the failure detection protocol and the aggregator.

FIG. 11 is a diagram showing an example of the configuration of a message transferred between the failure detection protocol 11 and the aggregator 15, and FIG. 12 is a diagram showing another example of the configuration. In the configuration shown in FIG. 11, the structure and the content of a transmission packet are stored in the data part and are capsulated in the in-apparatus communication header. On the other hand, in the configuration shown in FIG. 12, the message has the transmission packet structure and is a model used also for messaging within the apparatus. The area (109 or 129) in which the physical port number is specified and the area (118 or 128) in which the aggregated link checking mode is specified are the areas extended by the present invention. The in-apparatus communication header, 100 to 107, is removed when the packet is sent to the communication line. Because this in-apparatus communication header is used specifically within the apparatus, another structure may also be used if messaging can be performed within the apparatus. In the configuration shown in FIG. 12, the destination physical port number (129) is embedded in the transmission packet structure. This information, which is used only within the apparatus, is removed when the packet is sent to the communication line. The aggregated link checking mode (118 or 128), which is used to notify the other apparatus about the checking mode, may be omitted if the corresponding aggregated link checking mode settings match between the apparatuses. In step 91 of the processing procedure in the flowchart shown in FIG. 10 where the physical port number specification is checked, the area 109 or 129 is checked. In step 900 where the request source is checked, a source identifier 100 is checked in the configuration in FIG. 11, and an item that identifies the protocol type such as a destination port 124 is checked in the configuration in FIG. 12.

Figure 13:
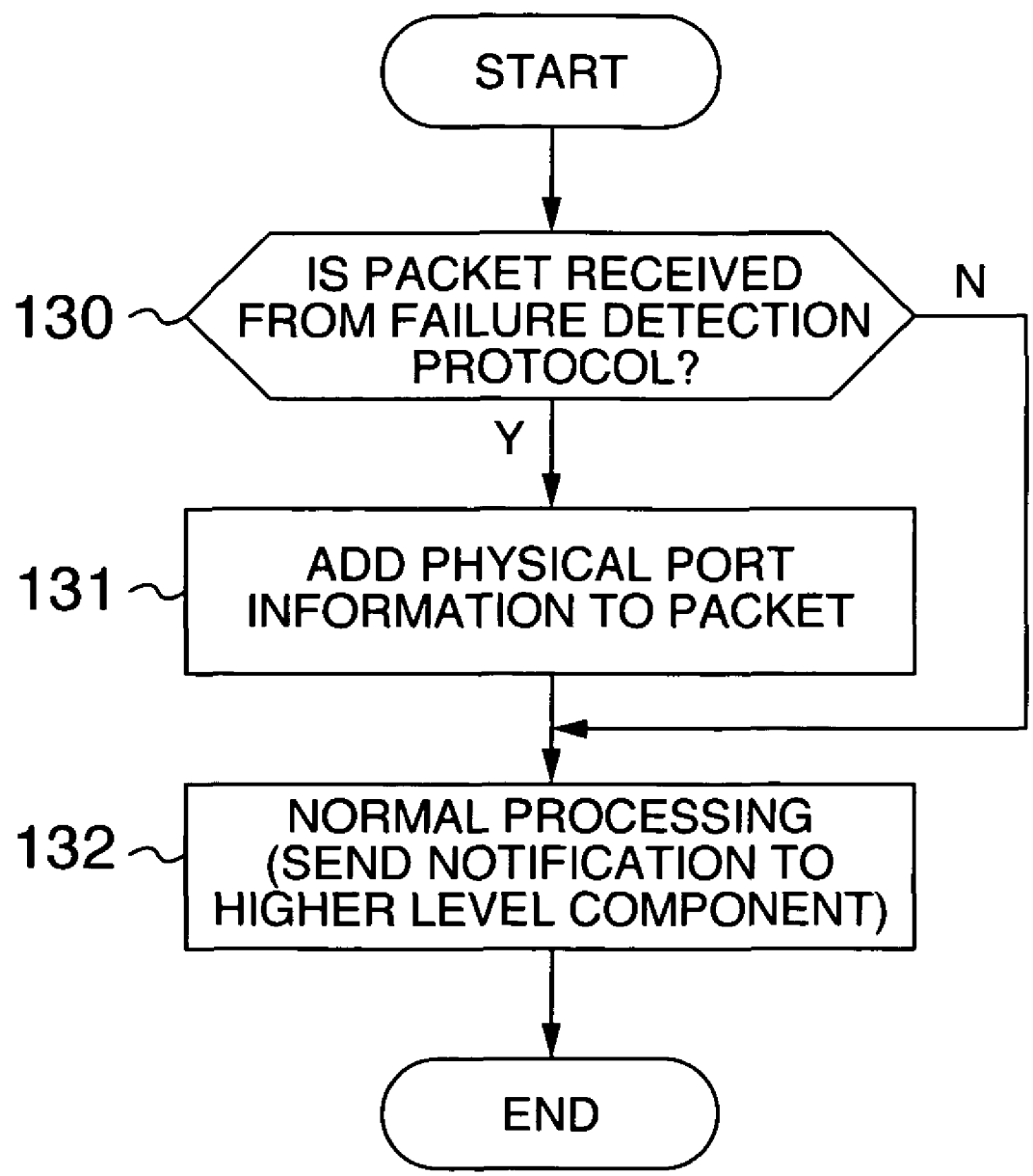
FIG. 13 is a flowchart showing an example of the processing procedure of the physical port monitoring control function when a message is received from a remote node.

FIG. 13 is a flowchart showing an example of the processing procedure of the physical port monitoring control function 21 when a packet is received from a remote node. If the packet received via the aggregated link is a packet from the failure detection protocol (step 130), the information on the physical port via which the packet is received is added to the packet (step 131), and a notification is sent to the higher-level application (failure detection protocol 11 when the received packet is a packet from the failure detection protocol) (step 132). At this time, the structure shown in FIG. 11 or FIG. 12 may be used as the structure of the notification instruction.

As described above, the present invention provides new functions, that is, aggregated link failure monitoring notification function 20 and physical port monitoring control function 21, and extends the management tables to perform communication line failure monitoring on a physical port basis. This configuration distinguishes between the case in which the communication of some of physical links of an aggregated link fails and the case in which the communication of all physical lines fails, thus allowing failure monitoring requests from routing protocols to be processed even if they have different path switching conditions for an aggregated link.

Because a communication failure can be identified not only for an aggregated link in its entirety but also for each of the physical links of an aggregated link, the method for applying the failure detection protocol to an aggregated link according to the present invention can be used as a failure detection method for a network system and a network apparatus (node) in an operation mode in which multiple routing protocols, which have different path switching conditions, use an aggregated link.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A network system, comprising:
a plurality of node apparatuses each of which forms an aggregated link having a plurality of physical links, at least one of said plurality of node apparatuses comprising a storage unit in which a failure detection protocol, which monitors for communication line failure in the aggregated link formed by the node apparatus, is stored, and a control unit that executes the failure detection protocol, and
wherein said control unit:
stores each failure monitoring request for the aggregated link issued by a routing protocol in each requesting source, each failure monitoring request indicating a corresponding requesting source that issued the failure monitoring request and specifying a corresponding failure detection notification condition for the failure monitoring request,
performs a failure monitoring operation on the aggregated link with each of the plurality of physical links of the aggregated link identified for each failure monitoring request, and
for each failure monitoring request, when a communication failure on one or more of the physical links of the aggregated link is detected, checks the corresponding failure detection notification condition of the failure monitoring request in accordance with predetermined information provided in the failure monitoring request that specifies whether a notification is desired when a communication of all physical links of the aggregated link fails or a notification is desired when a communication of a specified number of physical links of the aggregated link fails, and, when the failure detection notification condition corresponding to the failure monitoring request is satisfied, sends a failure detection notification to the requesting source that issued the failure monitoring request.

2. The network system according to claim 1, wherein the failure monitoring operation is performed on the aggregated link for each of the plurality of physical links of the aggregated link in parallel.

3. The network system according to claim 1, wherein the failure monitoring operation is performed on the aggregated link for the plurality of physical links of the aggregated link in a round robin method.

4. The network system according to claim 1 wherein the failure detection protocol is a protocol that uses a communication protocol in a transport layer.

5. The network system according to claim 1 wherein the failure detection protocol is a protocol created by extending BFD (Bidirectional Forwarding Detection).

6. A node apparatus accommodating an aggregated link having a plurality of physical links, the node apparatus comprising:
a storage unit in which a failure detection protocol, which monitors for communication line failure in the aggregated link accommodated by the node apparatus, is stored; and
a control unit that executes the failure detection protocol, wherein said control unit:
stores each failure monitoring request for the aggregated link issued by a routing protocol each requesting source, each failure monitoring request indicating a corresponding requesting source that issued the failure monitoring request and specifying a corresponding failure detection notification condition for the failure monitoring request,
performs a failure monitoring operation on the aggregated link with each of the plurality of physical links of the aggregated link identified for each failure monitoring request, and
for each failure monitoring request, when a communication failure on one or more of the physical links of the aggregated link is detected, checks the corresponding failure detection notification condition of the failure monitoring request in accordance with predetermined information provided in the failure monitoring request that specifies whether a notification is desired when a communication of all physical links of the aggregated link fails or a notification is desired when a communication of a specified number of physical links of the aggregated link fails, and, when the failure detection notification condition corresponding to the failure monitoring request is satisfied, sends a failure detection notification to the requesting source that issued the failure monitoring request.

7. The node apparatus according to claim 6, wherein the failure monitoring operation is performed on the aggregated link for each of the plurality of physical links of the aggregated link in parallel.

8. The node apparatus according to claim 6, wherein the failure monitoring operation is performed on the aggregated link for the plurality of physical links of the aggregated link in a round robin method.

9. The node apparatus according to claim 6 wherein the failure detection protocol is a protocol that uses a communication protocol in a transport layer.

10. The node apparatus according to claim 6 wherein the failure detection protocol is a protocol created by extending BFD (Bidirectional Forwarding Detection).

11. The network system according to claim 1, wherein the predetermined information provided in the failure monitoring request further specifies information on an operation to be performed in response to a failure.

* * * * *